United States Patent [19]

Haneda

[11] Patent Number: 4,857,756
[45] Date of Patent: Aug. 15, 1989

[54] POWER CONTROL UNIT FOR A COMPUTER SYSTEM

[75] Inventor: Isamu Haneda, Kyoto, Japan

[73] Assignee: Sharp Kabushiki Kaisha, Osaka, Japan

[21] Appl. No.: 166,650

[22] Filed: Mar. 11, 1988

[30] Foreign Application Priority Data

Mar. 17, 1987 [JP] Japan .................... 62-63068

[51] Int. Cl.$^4$ .............................. H02J 7/00
[52] U.S. Cl. ........................ 307/66; 307/64; 307/86; 361/93; 365/229; 365/228; 365/227
[58] Field of Search .......... 307/64, 66, 83, 84, 307/85, 87; 365/226–229; 361/92, 91, 93, 89, 87, 90

[56] References Cited

U.S. PATENT DOCUMENTS

| | | | |
|---|---|---|---|
| 3,428,820 | 2/1969 | Lyon | 307/64 |
| 3,912,940 | 10/1975 | Vince | 307/86 X |
| 4,017,779 | 4/1977 | McDonald et al. | 307/86 X |
| 4,241,372 | 12/1980 | Sears | 361/93 X |
| 4,476,399 | 10/1984 | Yoshida et al. | 307/64 X |
| 4,638,175 | 1/1987 | Bradford et al. | 307/64 |
| 4,677,311 | 6/1987 | Morita | 307/66 |
| 4,730,121 | 3/1988 | Lee et al. | 307/66 |
| 4,754,160 | 6/1988 | Ely | 307/64 |

Primary Examiner—William M. Shoop, Jr.
Assistant Examiner—Paul Ip
Attorney, Agent, or Firm—Flehr, Hohbach, Test, Albritton & Herbert

[57] ABSTRACT

Where a system including a main computer with a source battery for generating a system source voltage and a peripheral device having higher operating voltage than the system source voltage and a source voltage generator circuit which generates a source voltage corresponding to this operating voltage, supply of system source voltage from the source battery is prohibited and the source voltage from the source voltage generator circuit of the peripheral devices is used as the system source voltage of the entire system when the main computer is driving the peripheral device such that the consumption of the source battery for the main computer can be reduced.

2 Claims, 3 Drawing Sheets

FIG.—1

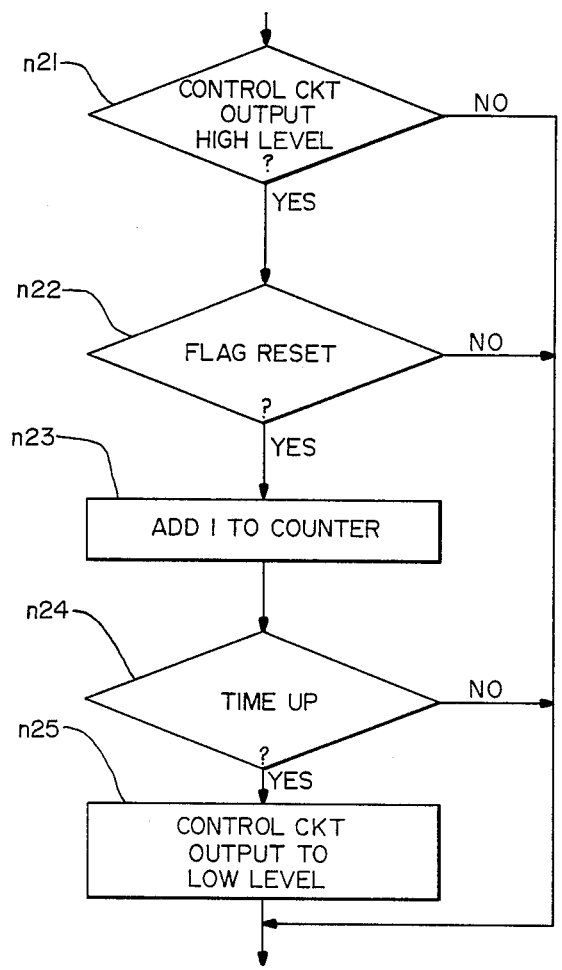
FIG.—4
FIG.—5

POWER CONTROL UNIT FOR A COMPUTER SYSTEM

BACKGROUND OF THE INVENTION

This invention relates to a power control unit for a system comprised of a MAIN computer and peripheral devices such as a floppy disk device and more particularly to such a power control unit for a portable system using a battery as its power source.

Consider, for example, a computer such as a pocket-size computer which can be operated from a DC source. Since such a computer uses CMOS, the range of its operating voltage is quite large. If the range of the operating voltage of a peripheral device such as a printer connected to such a computer is narrower than that of the main computer itself, it is not possible to operate such a peripheral device stably because the source voltage from the main computer is too low. One way to overcome this problem is to provide such peripheral devices with their own source voltage generating circuits for generating the source voltages required thereby such that power is supplied to a main computer and its peripheral devices from separate source circuits. Since a main computer is more frequently used alone rather than in combination with a peripheral device, however, it often happens that the power source for the main computer is consumed quickly. In the case of a battery-operated computer, in particular, the user finds it inconvenient to exchange batteries frequently.

SUMMARY OF THE INVENTION

It is therefore an object of the present invention in view of the above to limit the consumption of the source battery of a main computer.

The above and other objects of the present invention are achieved by providing an improved power control unit for a system comprised of a main computer with a source battery for generating a system source voltage and a peripheral device which has a higher operating voltage than this system's source voltage and is provided with a source voltage generator circuit for generating a source voltage corresponding to this higher operating voltage. With this power control unit, supply of the system source voltage from the source battery is prevented when the peripheral device is operating and the source voltage from the source voltage generator circuit for the peripheral device is used as the system's source voltage for the entire system.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
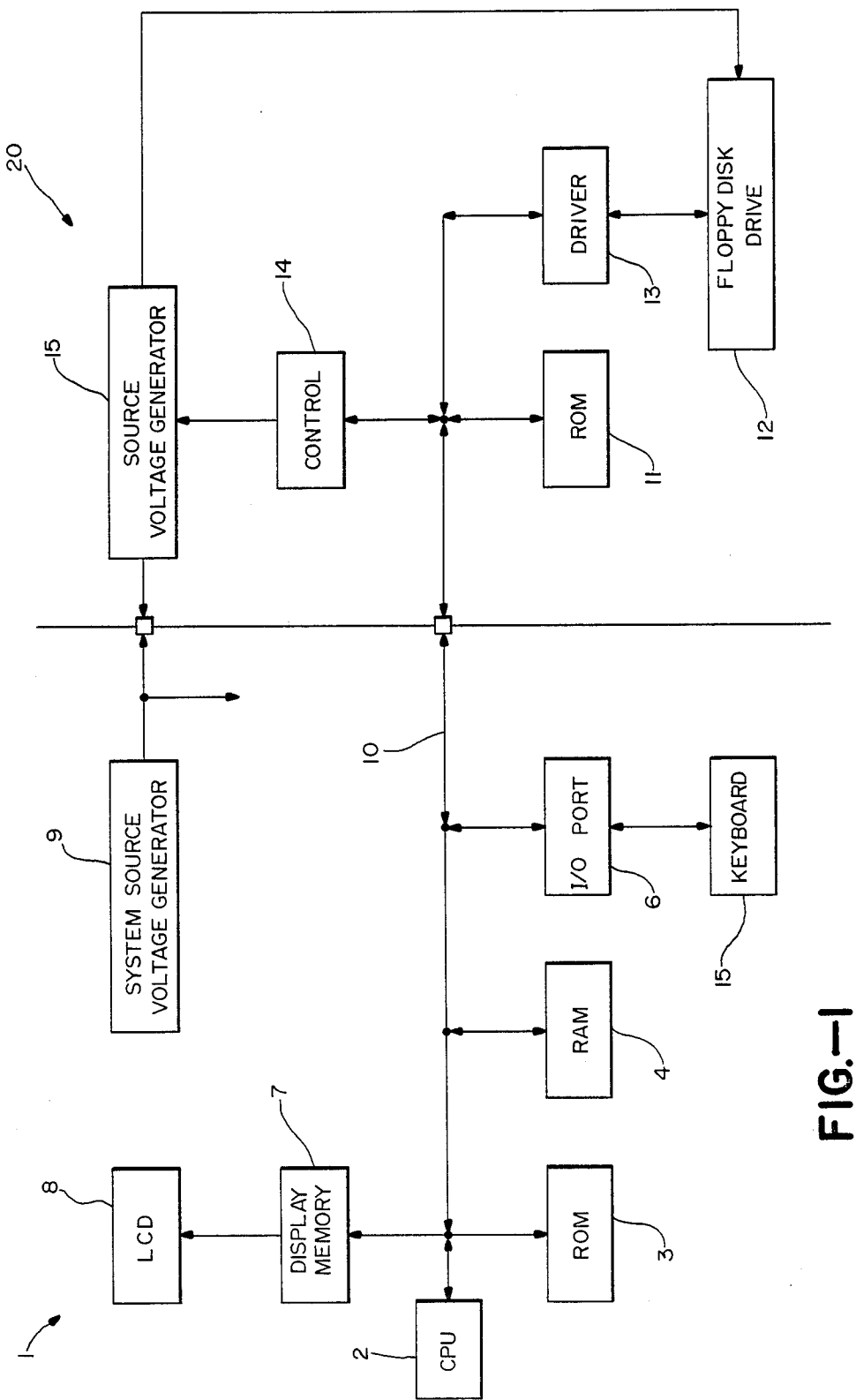
FIG. 1 is a block diagram of a unit embodying the present invention.

In what follows, the present invention is described by way of an exemplary system comprised, as shown in FIG. 1 of a main computer 1 and a floppy disk device 20 as its peripheral device. The main computer 1 includes a central processing unit CPU 2, a read-only memory ROM 3 storing a program for this CPU 2, a random-access memory RAM 4 providing its work areas and date areas, a keyboard 5, an IO port 6, a display memory 7, a liquid crystal display device 8 for displaying the contents of this display memory 7, and a system source voltage generator circuit 9 for generating the system source voltage. Numeral 10 indicates a system bus. The floppy disk 20 includes a read-only memory ROM 11, a floppy disk drive 12, a driver circuit 13 for driving this disk drive 12, a control circuit 14 and a source voltage generator circuit 15 for generating the source voltage.

The operating voltage of the main computer 1 in this example is 4-6 V and the output voltage of the system source voltage generator circuit 9 having a battery as its sources is 4-4.5 V. As for the floppy disk device 20 serving as a peripheral device, on the other hand, the operating voltage of the driver circuit 13 and the floppy disk drive 12 is higher than the system source voltage, being 4.75-5.25 V, because the operating frequency of the driver circuit 13 is extremely high. The output voltage of the source voltage generator circuit 15 of this floppy disk device 20 is 4.75-5.25 V. According to the present example, the system source voltage generator circuit 9 of the main computer 1 and the source voltage generator circuit 15 of the floppy disk device 20 are so connected that the higher of the output voltages of these two circuits 9 and 15 will serve as the voltage for the system as a whole.

Figure 2:
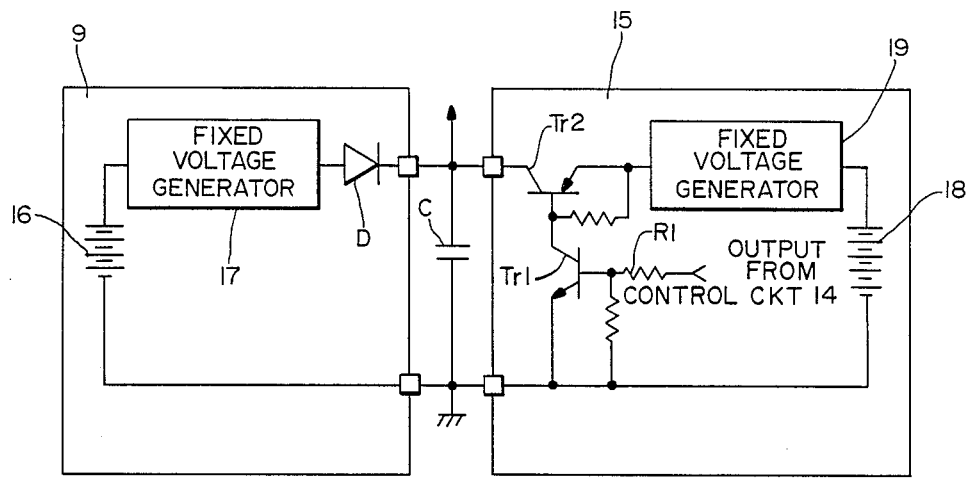
FIG. 2 is a detailed circuit diagram of a portion of the unit in FIG. 1, and FIGS. 3-5 are flow charts for the operation of the system shown in FIG. 1.

As shown in FIG. 2 which is a detailed circuit diagram of the system source voltage generator circuit 9 of the main computer 1 and the source voltage generator circuit 15 of the floppy disk device 20, the system voltage generator circuit 15 is comprised of a source battery 16, a fixed voltage generator circuit 17 and a diode D and a source voltage circuit 15 includes a source battery 18, a fixed voltage generator circuit 19, a first transistor $Tr_1$ and a second transistor $Tr_2$. The output of the control circuit 14 is applied to the base of this first transistor $Tr_1$ of the source voltage generator circuit 15 through a resister $R_1$. A capacitor C is connected between the system source voltage generator circuit 9 and the source voltage generator circuit 15 for removing noise.

When the output from the control circuit 14 of the floppy disk device 20 is low, the first and second transistors $Tr_1$ and $Tr_2$ of the source voltage generator circuit 15 are both off and the voltage from the system source voltage generator circuit 17 serves as the source voltage of the entire system. When the output from the control circuit 14 is high level, on the other hand, these two transistors $Tr_1$ and $Tr_2$ are both on and, in this situation, the higher of the source voltage from the system source voltage generator circuit 9 (4-4.5 V) and the source voltage from the source voltage generator circuit 15 (4.75-5.25 V) serves as the voltage for the entire system. The circuits are so structured that, when the floppy disk device 20 is not connected to the main computer 1 or when the main computer 1 itself is off, the output from the control will be low.

With this power control unit, in summary, the main computer 1 accesses the control circuit 14 before driving the floppy disk drive 20, thereby raising the output from the control circuit 14 to high level and thereby operates the source voltage generator circuit 15 to use its source voltage as the system source voltage. After the output voltage from the source voltage generator circuit 15 of the floppy disk device 20 stabilizes, the driving of the driver circuit 13 is started. Consumption of the source battery 16 of the main computer can be limited since the supply of the source voltage from the system source voltage generator circuit 9 of the main computer 1 is thus prevented when the floppy disk device 20 is operating and the source voltage from the source voltage generator circuit 15 of the floppy disk device 20 is used as the source voltage of the entire system. When the floppy disk device 20 is stopped, on the other hand, the output of the control circuit 14 is dropped to low level and the driving of the source voltage generator circuit 15 is stopped and the system is operated by the output voltage of the system source voltage generator circuit 9.

Figure 3:
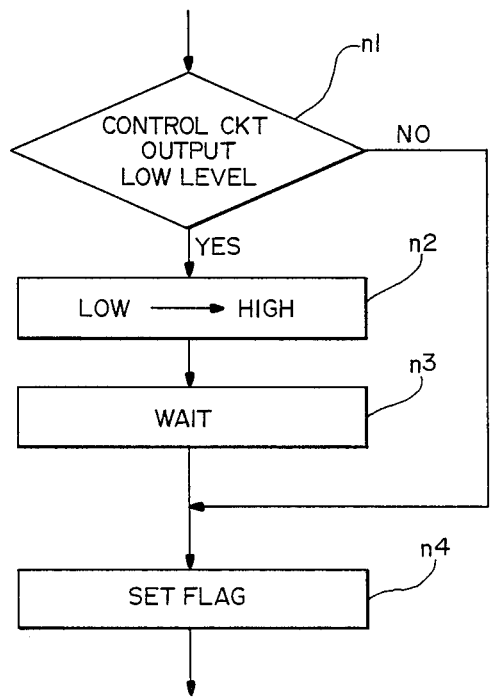

The operation of the computer system described above is explained next by way of the flow charts in FIGS. 3-5. When the floppy disk device 20 is driven by the main computer 1, the output level of the control circuit 14 is examined first (n1). If it is low, the system raises it to high level (n2) and drives the source voltage generator circuit 15, waiting until the output voltage therefrom is stabilized (n3). In the meantime, the capacitor C becomes charged and a flag is set (n4) in the RAM 4. If the output level of the control circuit 14 is already high (NO in Step n1), the system proceeds directly to Step n4.

If the operation of the source voltage generator circuit 15 is stopped immediately after the main computer 1 ceases to drive the floppy disk device 20, the system will have to wait again (n3) when the computer 1 again begins to drive the floppy disk device 20. In this example, therefore, the source voltage generator circuit 15 is operated for a specified length of time after the main computer 1 ceases to drive the floppy disk device 20. Thus, the system is so programmed that the flag is reset if the output of the control circuit 14 stays high for a period of time although the main computer 1 has ceased to drive the floppy disk device 20, while the flag is set if the main computer 1 is driving the floppy disk device 20. In other words, the flag is for indicating which condition the system is in.

FIG. 4 shows the operation explained above. When the main computer 1 ceases to drive the floppy disk device 20, a counter is cleared in Step n11 in order to stop the source voltage generator circuit 15 after a fixed length of time. After this fixed length of time, the flag is reset (n12) to show that the source voltage generator circuit 15 is stopped and the system proceeds to the next process.

FIG. 5 represents a portion of a timer interrupt routine of the CPU 2 whereby an interrupt is imposed at fixed time intervals. In order to stop the source voltage generator circuit 15 after a fixed time period when the main computer 1 stops driving the floppy disk device 20, the content of the counter is increased by one periodically in this routine and when it reaches a specified value, the source voltage generator circuit 15 is stopped. Thus, the output of the control circuit 14 is examined in Step n21 and, if it is high, the flag is examined to ascertain whether the main computer 1 is driving the floppy disk device 20 or the source voltage generator circuit 15 is to be stopped (n22). If the flag is reset, the content of the counter is increased by one (n23) and if it is found to have reached a specified value (YES in Step n24), the output of the control circuit 14 is reduced to low level (n25) in order to stop the source voltage generator circuit 15. If the output of the control circuit 14 is found not to be in high level in Step n21, the source voltage generator circuit 15 is interrupted as having already stopped and the system proceeds to the next process. If the flag is not found to be reset in Step n22, the floppy disk device 20 is not being driven and the system proceeds to the next process.

In summary, when the main computer 1 is driving the floppy disk device 20, supply of system source voltage from the source battery is prohibited and the source voltage from the source voltage generator circuit of the peripheral device is used as the source voltage for the entire system. Consumption of the source battery for the main computer 1 which is more frequently used than the peripheral device can therefore be reduced.

What is claimed is:

1. In a power control unit for controlling the electrical power source of a system including a main computer with a source battery for generating a system source voltage and a peripheral device having a higher operating voltage than said system source voltage and a source voltage generator circuit which generates a source voltage corresponding to said operating voltage, the improvement wherein
said power control unit comprises
a first voltage generating means connected to a system bus for generating a lower voltage,
a second voltage generating means for generating a higher voltage,
a control means serving to output a high output signal or a low output signal, depending on whether an output of power at said higher voltage through said system bus is desired or not,
a first transistor having the base thereof connected to said control means and the emitter thereof grounded, and
a second transistor having the base thereof connected to the collector of said first transistor, the emitter and the base thereof connected to said second voltage generating means and the collector therof connected to said system bus.

2. The power control unit of claim 1 further comprising a capacitor connected between said first voltage generating means and said second voltage generating means for removing noise.

* * * * *